Nov. 26, 1957     E. ESMENARD     2,814,691
DEVICE FOR LOCKING MOVABLE PARTS, NOTABLY RELAY ARMATURES
Filed March 1, 1952     2 Sheets-Sheet 1
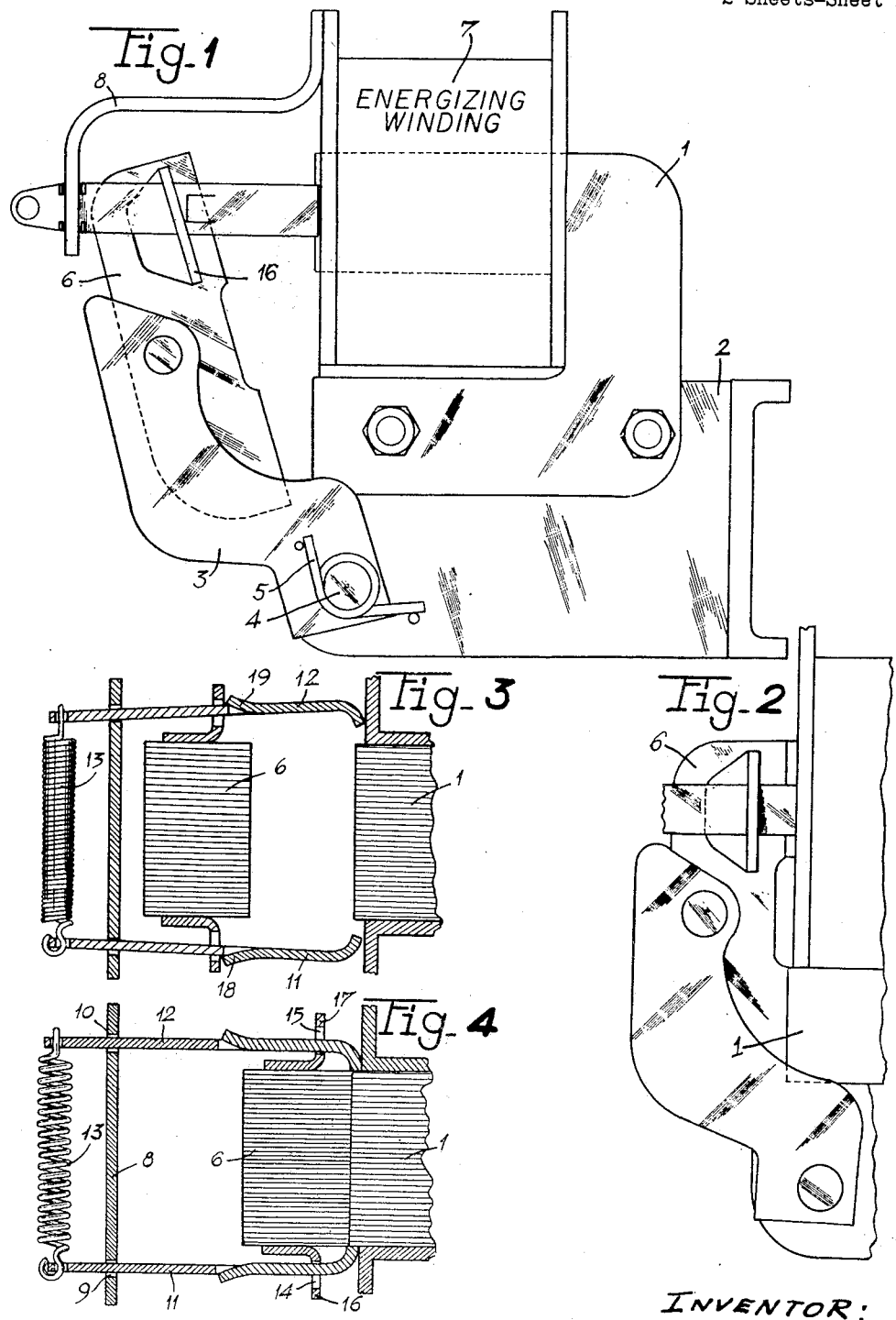
INVENTOR:
EMILE ESMENARD Nov. 26, 1957          E. ESMENARD          2,814,691
DEVICE FOR LOCKING MOVABLE PARTS, NOTABLY RELAY ARMATURES
Filed March 1, 1952          2 Sheets-Sheet 2
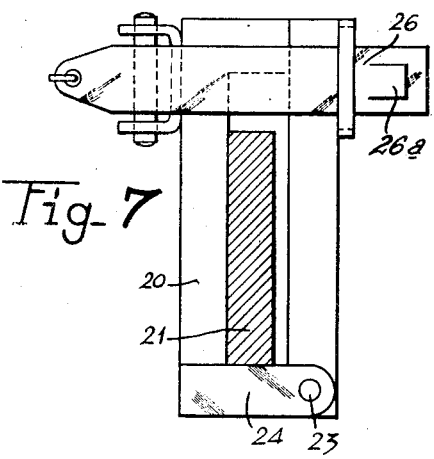
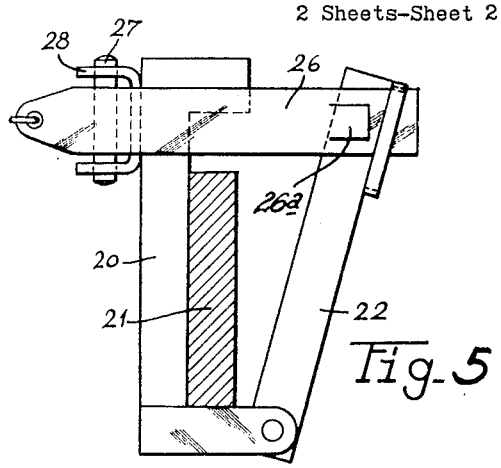
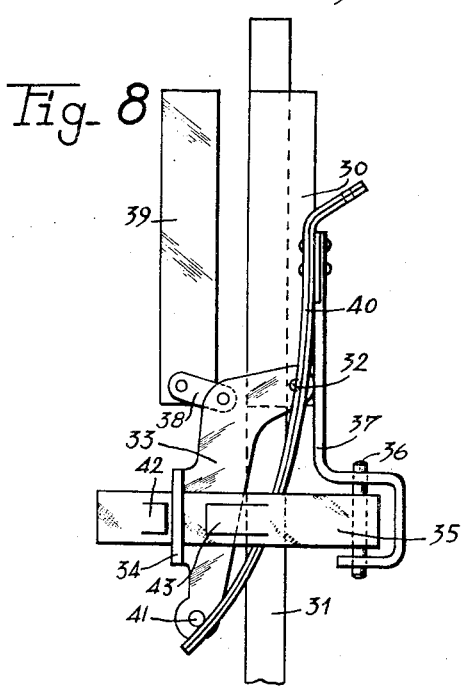
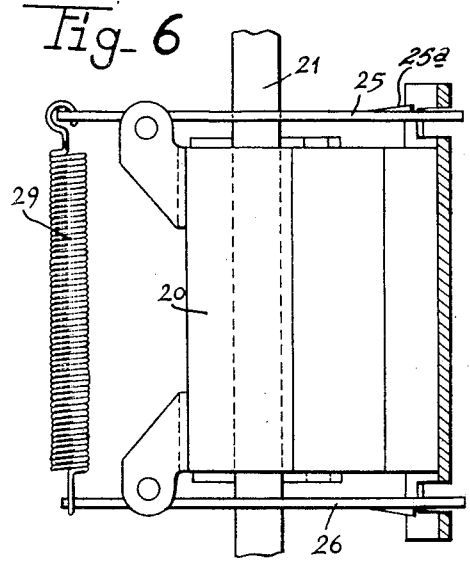
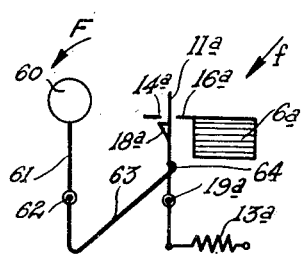
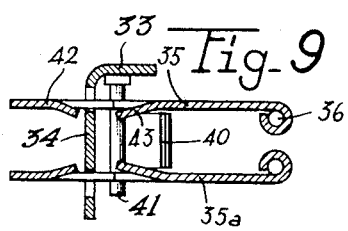
INVENTOR:
EMILE ESMENARD United States Patent Office 2,814,691
Patented Nov. 26, 1957

2,814,691

DEVICE FOR LOCKING MOVABLE PARTS, NOTABLY RELAY ARMATURES

Emile Esmenard, Paris, France, assignor to Brandt & Fils, Paris, France

Application March 1, 1952, Serial No. 274,471

Claims priority, application France March 8, 1951

13 Claims. (Cl. 200—88)

This invention refers generally to locking means having movable parts to be locked in one position, as well as to be released for displacement in another position.

The problem of insensitiveness to shocks crops up with acuteness in many technical fields and more particularly when the untimely actuation of control devices or interlocking gears is to be avoided. The same applies to abrupt accelerations or upsettings of the equilibrium. For instance, in railway rolling stock, jerks and centrifugal forces are a frequent cause of untimely displacements of movable parts. The same is observed on ships when a strong gale causes them to take a list. More particularly, in war material many apparatus are subjected to extremely violent shocks; thus, the control mechanisms in the vicinity of large-size guns are strongly shaken on firing; similarly, when depth-charges explode the shock-waves developed thereby are very strong and propagate throughout the hull of an attacked submarine. Therefore, it is extremely important, in this case, to prevent any untimely or undesired operations likely to result from the disorderly movements of electric relays, or faulty maneuverings made possible by troubles in a release mechanism.

It is the chief object of this invention to obtain this result and for this purpose a movable part adapted to be insensitive to shocks is operatively connected with a controlled locking device so arranged as to prevent the movable part from moving in at least one direction, and to be insensitive to any accelerations occurring in a direction likely to cause the untimely actuation of this movable part.

According to a first embodiment of the invention a movable part is associated with a simple locking device adapted to move only in one direction, i. e. being the direction in which the movable part is insensitive to shocks, owing to the fact, for example, that it is held against movement in that direction by the reaction of its guide members. According to a specific embodiment of the invention a simple locking device is associated with a mass movable in a manner similar to that of this locking device, and in the same direction, when a shock occurs, this mass having a greater inertia than the locking device and being attached to a reversing lever that bears itself against the locking device.

It is particularly advantageous to combine the control of the locking devices and movable part into a single control action with successive operational steps. The invention is particularly applicable to the locking of movable armatures of electric relays. For this purpose the armature is associated with a pair of pawls resiliently urged away from each other and formed with projections adapted to engage the armature so as to retain it in its locked condition in case of shock, the movement of the pawls being substantially orthogonal relative to the armature movement. These pawls are preferably made of magnetic material and positioned on either side of the movable armature; they are formed with extensions positioned in the vicinity of the end of the attracting core.

Thus, the leak flux of the magnetic core will first unlock the pawls by causing them to move toward each other, before the active flux attracts the armature. Besides, this unlocking action may be brought about by an auxiliary control means such as the winding of an unlocking relay, independently or not of the main control means.

In some cases, the magnetic circuit of a relay of this type may comprise a pull winding, but in the case of an excess current relay mounted on a connecting bar, the pawls and movable armature may be attracted by the magnetic field of the bar itself, without the provision of any winding.

Finally, according to an extremely simple embodiment of a heat-controlled excess current relay, the release action may be produced mechanically by moving the pawls away from each other by means of the deflection of a thermocouple adapted simultaneously to be inserted between the pawls and to push one lever of a toggle the arms of which carry the armature to be controlled.

The accompanying drawings forming part of this specification illustrate diagrammatically by way of examples a few embodiments of the invention and should not be construed as limiting the scope and extent of the invention. In the drawings:

Fig. 1 is a side view of the armature of a magnet-operated relay in its open position.

Fig. 2 is a similar but fragmentary view showing the armature in its closed position.

Fig. 3 is a diagrammatical sectional view of the locking device in its locking position, and Fig. 4 shows the same device in its released condition.

Fig. 5 is a side view of an excess current relay fitted with a locking device adapted to lock the relay armature in its open position as shown.

Fig. 6 is a plan view from above with part section of the device of Fig. 5.

Fig. 7 is a side view similar to Fig. 5 showing the relay in its closed position.

Fig. 8 is a plan view from above of a heat-controlled relay fitted with the locking device of the invention.

Fig. 9 is a diagrammatical sectional view showing the arrangement of the locking members in the device of Fig. 8.

Fig. 10 represents diagrammatically a locking device with associated mass of great inertia.

Referring first to Figs. 1 to 4, the pulling action in an electro-magnet forming part, for example, of a minimum relay is provided by a U-shaped magnet core 1 fixed to a bracket 2. On this bracket 2 is pivotally mounted about a fixed pin 4 a movable assembly 3 urged towards its open position by a spring 5 and having mounted thereon a movable magnet armature 6. This armature engages both ends or poles of the magnet core 1 so as to close the magnetic circuit. For this purpose the core 1 carries an energizing winding 7. Another bracket 8 rigid with the fixed parts of the relay is formed with a pair of slots 9, 10 for the reception therewithin of a pair of pawls or locks 11, 12 respectively. On the side of the bracket 8 which is opposite to the core 1 pawls 11 and 12 are interconnected by a tension spring 13. These pawls 11 and 12 pass through apertures 14 and 15 formed in lugs 16, 17 suitably secured to armature 6. The inner ends of the pawls are bent and disposed in the vicinity of one of the arms of core 1. When the armature 6 is in its open position, lugs 16, 17 are adapted to be checked by checking projections 18, 19 carried by or formed on the pawls 11 and 12. These projections may be punched out from these pawls.

The above-described device operates as follows:

The inner curved ends of the pawls 11 and 12 are normally urged away from each other by the spring 13, and the projections 18, 19 in cooperation with lugs 16, 17 prevent any untimely actuation of the armature 6 (Figs. 1 and 3). When an energizing current flows through the winding 7 the leak flux of core 1 moves the pawls 11, 12 towards each other against the resistance of spring 13 while the main flux pulls the armature 6 (Figs. 2 and 4).

In the locked position (Figs. 1 and 3) if the core 6 forming the armature proper is subjected to an abrupt acceleration in its normal direction of movement, that is towards the core 1, both projections 18 and 19 will definitely check it. If a shock occurs at right angles to this first direction one locking pawl 11 or 12 may recede from its locking position but the other will still check the armature. Any oblique accelerations relative to these two principal directions of possible movement of the armature 6 and pawls 11, 12 will not fail to be accompanied by a locking action exerted by at least one pawl.

In this case, the locking action is effected only in the rest position of the armature 6 because in the operated position thereof the magnetic pull exerted by the core will produce an engagement the force of which is sufficient practically to withstand any tendency to open the armature which may arise from a shock.

This locking method is also applicable to the construction of an excess current relay such as the very simple relays mounted directly on the connecting bars of a switchboard. A relay of this type (Figs. 5 to 7) comprises a U-shaped magnetic core 20 secured through any adequate means to a bar 21 in which a strong current is circulated. In front of this bar 21 is mounted a movable armature 22 pivotally mounted through pins 23 on side extensions 24 of the fixed core 20. Thus, the movable armature 22 forms with the magnetic core 20 a magnetic circuit surrounding the conductor 21. A pair of locking arms 25, 26 similar to the locking pawls 11, 12 of the preceding embodiment are pivotally mounted on pins 27 carried by straps 28 rigid with the core 20, said arms acting as locks by means of checking projections 25a and 26a. The operation of this arrangement is obvious and the excess current release of the locking arms 25 and 26 occurs only in case the latter are subjected to a leak flux pull sufficient to overcome the tension of spring 29.

As these locking arms are so arranged as to be attracted by the armature 22 just when the latter is pulled by core 20, it will be apparent that this relay, although insensitive to shocks, will become operative at exactly the predetermined value of the current flowing through the bar 21.

In the various embodiments described hereinabove the locking members are released by the same agency as that normally controlling the movement of the movable armature. However, other arrangements may be resorted to, as in the case of the relay mechanism described hereunder wth reference to Figs. 8 and 9. In this case a U-shaped core 30 is secured through any suitable means to a bar 31 through which electrical current is caused to flow. This core is provided with a support carrying a pivot pin 32 having mounted thereon a guide arm 33 formed with a lug 34. A pair of parallel apertures are formed in this lug 34 and engaged by a pair of locking pawls 35 and 35a. These pawls are pivotally mounted on pins 36 carried by a suitably shaped strap 37 fixed by an extension thereof to the fixed core 30. Both pivots 36 are disposed at right angles to the pin 32. The guide arm 33, which may also consist of a pair of parallel members, carries a small link 38 hingedly connected at one end to the guide arm 33 and at the opposite end with the movable armature 39 adapted to cooperate with the core 30. The assembly consisting of guide arm 33 and link 38 forms a toggle-lever.

On the core 30 is fixed a bimetallic strip 40 positioned above the conductor 31. This bimetallic strip passes between the superimposed locking pawls 35 and 35a and is adapted, when deflected by a predetermined change in temperature as will be explained presently, to engage a stud 41 carried by the free end of guide arm 33. Both locking pawls 35, 35a are formed with punched inner projections 42 acting as catches and 43 acting as cam faces engageable by the side edges of the bimetallic strip 40.

The above-described device operates as follows:

When the bimetallic strip 40 is subjected to abnormal heating by the shunt current derived from the main conductor 31, it is accordingly deflected and its free end bears against the actuating pin 41 while its body moves the locking portions of the pawls 35, 35a away from each other by engaging the cam faces 43 (see Fig. 9). When the guide arm 33 has pivoted to a sufficient extent the link 38 of the toggle will clear the armature 39.

In the locking position, just as explained with reference to Fig. 9, the accelerations likely to move the armature 39 are not capable of simultaneously acting upon both locking pawls 35 and 35a and the locking condition is maintained.

Modifications may be made in the embodiments described hereinabove. Thus, a substantially similar locking arrangement may be applied to parts controlled through pneumatic, hydraulic or mechanical means. The locking pawls may be actuated as well by means other than those provided for operating or moving the member to be locked. Moreover, the locking action could be effected by a single locking member operating in one direction through its own inertia and, in the case of a shock in the reverse direction, through the greater inertia of a mass momentarily connected to said locking member so as to actuate it as well in the same locking direction.

For example, in the embodiment illustrated in Fig. 10, the movable magnet armature 6a carries a lug 16a formed with a slot 14a for the reception therewithin of a pawl or lock 11a formed with a checking projection 18a and pivotally mounted on a pin 19a, said pawl being associated with a release spring 13a. A mass 60 is secured on one end of a lever 61 pivoted at 62, the other end of said lever 61 being bent to form an arm 63 terminating in a hook 64 engaging the pawl 11a.

Said device operates as follows:

If in the locked position of the device illustrated in the Fig. 10 a shock occurs in a direction f, the mass 60 and the pawl 11a are displaced in the direction of arrow F. The locking effect of the pawl is reinforced and the mass 60 pivots about pin 62 without any action of said pawl. If, on the contrary, an abrupt acceleration occurs in a direction opposite to the direction of arrow f, the checking effect of projection 18a may be destroyed. However mass 60 pivots in a reverse direction with respect to arrow F about pivot 62 so that the hook 64 engages the pawl 11a and maintains the same in locking position.

Of course, various modifications may be made to the forms of embodiment described hereabove without departing from the spirit and scope of the invention as set forth in the appended claims.

What I claim is:

1. A locking device for movable armatures of electric relays having a core comprising, in combination, a movable armature, a guide arm pivoted on the core of the relay and formed with a lug parallel to its pivot axis and having two parallel apertures, a link connecting said guide arm with said movable armature, two locking pawls pivotally mounted about axes disposed at right angles to the pivot axis of said guide arm, said pawls respectively engaging said apertures and being formed on either side of said lug at rest with facing projections one pair of which acts as locking means with respect to said lug, a bimetallic element passing between the locking pawls and secured at one end on said core, the other end of said bimetallic element being adapted to engage a stud carried by the free end of said guide arm when deflected by an abnormal heating, said bimetallic element bearing on the other pair of projections of said locking pawls which act as unlocking cams, while its action on said stud causes actuation of a toggle device defined by said guide arm and said link.

2. A locking device for movable parts comprising, in combination, a member movable from a rest position to an operative position under the action of an operative force, respective means establishing locking engagements in opposite directions with said movable member in said rest position, whereby said movable member is rendered insensitive to any shocks which would be otherwise capable of untimely displacing said movable member from its rest position to the operative position which it can occupy, means sensitive to said operative force for simultaneously releasing said locking engagements of said locking means, respectively, in opposite directions as soon as said operative force acts on said movable member for displacing the latter from its rest position to its operative position, means for returning said movable member to its rest position as soon as said operative force ceases, and means urging in opposite directions said respective locking means into said locking engagements with said movable member as soon as the latter reaches its rest position.

3. A device of the character described having movable parts comprising, in combination, a member movable from a rest position to an operative position under the action of an operative force, two locking devices respectively displaceable in opposite directions for locking said movable member in said rest position whereby said movable member is rendered insensitive to shocks in any direction, which would be otherwise capable of untimely displacing said movable member from its rest position to the operative position which it can occupy, means sensitive to said operative force for simultaneously unlocking said two locking devices in opposite directions as soon as the operative force acts on said movable member for displacing the latter from its rest position to its operative position, means for returning said movable member to its rest position as soon as said operative force ceases, and means urging, respectively, in opposite directions said two locking devices to lock said movable member as soon as the latter reaches its rest position.

4. A device of the character described having movable parts; comprising in combination, a member movable from a rest position to an operative position under the action of an operative force, two locking devices respectively displaceable in opposite directions for locking said movable member in said rest position whereby said movable member is rendered insensitive to shocks in any direction, which would be otherwise capable of untimely displacing said movable member from its rest position to the operative position which it can occupy, means sensitive to said operative force for simultaneously unlocking said two locking devices in opposite directions as soon as the operative force acts on said movable member for displacing the same from its rest position to its operative position, means for returning said movable member to its rest position as soon as said operative force ceases, and means for, respectively, urging in opposite directions said two locking devices into locking engagement with said movable member as soon as the latter reaches its rest position, the displacements of said movable member and of said locking device extending in different directions.

5. A device according to claim 4, wherein each movable member and said locking devices are, respectively, mounted on pivot means, the pivotal axes of which being directed at right angles to each other.

6. A locking device for movable parts comprising, in combination, a part which is movable between a rest position and an operative position and which must remain insensitive to shocks in said rest position, two locking members respectively displaceable in opposite directions for permanently locking said part in said rest position whereby said movable member is rendered insensitive to shocks applied in any direction, said shocks being otherwise capable of untimely displacing said part from its rest position to the operative position which it can occupy, means for simultaneously unlocking said locking members in opposite directions and for simultaneously moving said movable part from its rest position towards its operative position, means for returning said movable part to its rest position when said moving means ceases to be operative, and means for, respectively, urging in opposite directions said two locking members into locking engagement with said movable part as soon as the latter reaches its rest position.

7. In combination, a relay comprising a core, a conductive element carried by said core and adapted to generate an electromagnetic flux when fed with electric current, an armature movable from a rest position without contact with said core to an operative position in contact engagement with said core as soon as said conductive element is fed with said current, a locking device engaging said armature in its rest position, means for urging said locking device into locking engagement with said movable armature under the action of forces directed in opposite directions, whereby said armature in its rest position remains insensitive to shocks applied in any direction and capable of untimely displacing said movable armature from its rest position to its operative position, means sensitive to said current fed through said conductive element for moving said locking device against the action of said urging means in order to unlock said armature, whereby as soon as said conductive element is fed with said current said locking device is unlocked and the armature is simultaneously attracted by the resultant magnetic flux and moved to its operative position, and means for returning said armature to its rest position as soon as feeding of said conductive element with current is cut off.

8. A combination according to claim 7, wherein the movable armature is provided with a lateral lug formed with an aperture, said locking device comprising a locking pawl pivotally mounted and defining a projection adapted to bear on said lug for locking said armature in its rest position and to pass through said aperture for unlocking said armature, said urging means comprising resilient means connected to said pawl for pivoting the same in order to urge said projection in locking engagement with said lug, a lever pivotally mounted around an axis parallel to the pawl axis and provided with one part formed as a hook for engaging said pawl, and a mass carried by said lever, the relative positions of said resilient means and lever axis with respect to the pawl axis and of said hook and mass with respect to said lever axis being so determined that, the armature remaining in its rest position, as soon as an abrupt acceleration is applied to said pawl which tends to displace the projection in registering relation with said aperture and simultaneously to move the armature towards its operative position, said pawl being maintained in locking position by the hook under the resulting pivotal movement of the mass around the lever axis.

9. In combination, a relay comprising a core, a conductive element carried by said core and adapted to generate an electromagnetic flux when fed with electric current, an armature movable from a rest position without contact with said core to an operative position in contact engagement with said core as soon as said conductive element is fed with said current, two locking pawls adapted for simultaneous movement in opposite directions and defining projections adapted to permanently lock said movable armature in its rest position, means urging said pawls into locking engagement with said movable armature, whereby said armature in its rest position remains insensitive to shocks applied in any direction and capable of untimely displacing said movable armature from its.

rest position to its operative position, means sensitive to the current fed through said conductive element for moving said locking pawls against the action of said urging means in order to unlock said armature, whereby as soon as said conductive element is fed with said current said locking pawls are unlocked and the armature is simultaneously attracted by the resultant magnetic flux and moved to its operative position, and means for returning said armature to its rest position as soon as the feeding of said conductive element with current is cut off.

10. In combination, a relay comprising a frame, a core secured on said frame, an energizing winding carried by said core, and a movable armature pivotally mounted on said frame between a rest position without contact with said core as long as said winding is de-energized and an operative position in contact engagement with said core as soon as said winding is energized, two locking pawls made of magnetic material pivotally mounted on said frame for simultaneous pivotal movement in opposite directions and defining projections adapted to permanently lock said movable armature in its rest position, resilient means connected with said locking pawls for urging the latter into locking engagement with said movable armature, whereby said armature in its rest position remains insensitive to shocks generated in any direction, said pawls having parts positioned in the vicinity of the lateral faces of said core, whereby upon energization of said winding the leak flux from said core attracts said pawls against the action of said resilient means for unlocking the armature while the main flux from said core simultaneously attracts said movable armature for moving the same to its operative position, and means for returning said movable armature to its rest position as soon as said winding is de-energized.

11. In combination, a relay comprising a frame, a core secured to said frame, an energizing winding carried by said core, a movable armature pivotally mounted on said frame between a rest position without contact with said core as long as said winding is de-energized and an operative position in contact engagement with said core as soon as said winding is energized, said movable armature being provided with lateral lugs formed with apertures, two locking pawls made of magnetic material pivotally mounted on said frame for simultaneous pivotal movement in opposite directions passing through said apertures and defining a pair of diverging facing projections adapted to bear on said lugs for locking said armature in its rest position and to pass through said apertures for unlocking said armature, resilient means connected with said pawls for urging said diverging projections into bearing engagement with said lugs, whereby said armature in its rest position remains insensitive to shocks generated in any direction, said pawls having parts positioned in the vicinity of the lateral faces of said core, whereby upon energization of said winding the leak flux from said core attracts said pawls against the action of said resilient means for passing said diverging projections through said apertures in order to unlock the armature while the main flux from said core simultaneously attracts said movable armature for moving the same to its operative position, and means for returning said movable armature to its rest position as soon as said winding is de-energized.

12. A combination according to claim 11, wherein said movable armature is pivotally mounted about a pivot pin, said locking pawls being pivotally mounted at right angles with respect to the pivoted axis of said pivot pin.

13. In combination, a relay comprising a frame, a core secured on said frame, a conductive element carried by said core and adapted to generate an electromagnetic flux when fed with electric current, an armature movable between a rest position without contact with said core as long as said conductive element is devoid of current feed and an operative position in contact engagement with said core as soon as said conductive element is fed with current, a toggle device for locking said armature in its rest position and having a guide arm pivoted on said core about an axis perpendicular to the direction of movement of said armature and a link connecting said guide arm with said armature, said guide arm being provided with a lug parallel to said axis and formed with two parallel apertures, two locking pawls pivotally mounted on said frame for simultaneous pivotal movement in opposite directions about axes at right angles with respect to said axis passing through said apertures and defining two pairs of facing projections diverging in opposite directions, the first pair of which being adapted to bear on said lug for locking said toggle device in the rest position of said armature and to pass through said apertures for unlocking said toggle device, resilient means connected with said locking pawls for urging said first pair of diverging projections into bearing engagement with said lug, whereby said armature in its rest position remains insensitive to shocks generated in any direction, a bimetallic element extending between said locking pawls in contacting relation with the same near the beginning of the second pair of facing diverging projections and secured at one end on said core, and a stud carried by the free end of said guide arm and adapted to engage the free end of said bimetallic element, whereby upon feeding of said conductive element with a main current the deflection of said bimetallic element abnormally heated by shunt current derived therethrough from said main current generates, on the one hand, the pivoting of said pawls around their pivotal axes against the action of said resilient means under the action of said bimetallic element on said second pair of projections for passing the projections of the first pair through said apertures in order to unlock the toggle device and, on the second hand, the actuation of said toggle device under the action of said bimetallic element on said stud in order to unlock said armature while the electromagnetic flux from said conductive element simultaneously attracts said movable armature for moving the same to its operative position.

References Cited in the file of this patent

UNITED STATES PATENTS

| | | |
|---|---|---|
| 813,638 | Fretts | Feb. 27, 1906 |
| 863,687 | Abbott | Aug. 20, 1907 |
| 866,825 | Summers et al. | Sept. 24, 1907 |
| 1,100,134 | Jacobson | June 16, 1914 |
| 1,225,652 | Kruger | May 8, 1917 |
| 1,278,467 | Hoeschen | Sept. 10, 1918 |
| 1,433,952 | Kendall | Oct. 31, 1922 |
| 1,891,015 | Rich | Dec. 13, 1932 |
| 2,264,027 | Holmes | Nov. 25, 1941 |
| 2,340,092 | Wells | Jan. 25, 1944 |
| 2,426,301 | Ellis et al. | Aug. 26, 1947 |
| 2,491,315 | Johnson | Dec. 13, 1949 |
| 2,495,633 | Hayward | Jan. 24, 1950 |

FOREIGN PATENTS

| | | |
|---|---|---|
| 34,156 | Switzerland | June 26, 1905 |
| 110,046 | Austria | June 25, 1928 |
| 270,843 | Great Britain | May 19, 1927 |
| 581,709 | France | May 15, 1924 |